United States Patent
Kanda

[19]

[11] Patent Number: 5,838,418
[45] Date of Patent: Nov. 17, 1998

[54] ELASTICALLY RETRACTING TEMPLE ASSEMBLIES FOR SPECTACLES

[75] Inventor: Kiyomi Kanda, Yao, Japan

[73] Assignee: World Optical Co., Ltd., Osaka, Japan

[21] Appl. No.: 822,584

[22] Filed: Mar. 20, 1997

[30] Foreign Application Priority Data

Apr. 16, 1996 [JP] Japan ................................. 8-094480

[51] Int. Cl.⁶ .................................................. G02C 5/14
[52] U.S. Cl. .......................... 351/119; 351/113; 351/121
[58] Field of Search ................................. 351/111, 113, 351/119, 121, 153; 16/228

[56] References Cited

U.S. PATENT DOCUMENTS 5,018,242  5/1991  Guy et al. ................................. 351/121

FOREIGN PATENT DOCUMENTS 4-33017  3/1992  Japan .

*Primary Examiner*—Huy Mai
*Attorney, Agent, or Firm*—Jordan and Hamburg

[57] ABSTRACT

A temple assembly pivotably mounts to a lens holding frame of spectacles. The temple assembly has a first temple portion having a pivot member for pivotably attaching to the lens holding frame and an abutment for engaging the lens holding frame to restrict outward pivoting of the first temple portion away from the lens holding frame. A second temple portion is provided having a first end portion with an ear engaging section and a temple shaft slidably engaging the first temple portion. The first temple portion includes a receiving tube for slidably receiving the temple shaft therein through a first end opening. The pivot member has a hinge shaft with a pivot lug pivotably attachable to the lens holding frame. The hinge shaft is slidably received in the receiving tube through a second end opening of the receiving tube. A bias mechanism is provided for retractably biasing the temple shaft into the receiving tube and for retractably biasing the hinge shaft into the receiving tube to oppose extraction of the hinge shaft from the receiving tube by pivoting action of the abutment engaging the lens holding frame.

12 Claims, 8 Drawing Sheets

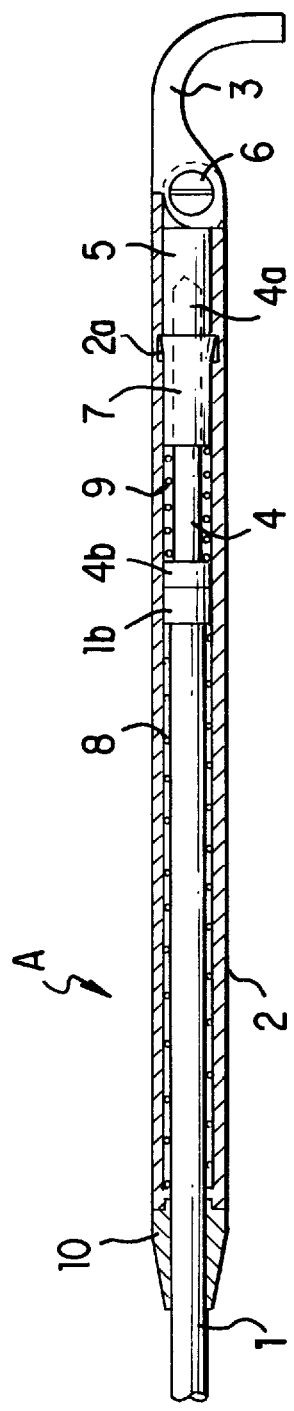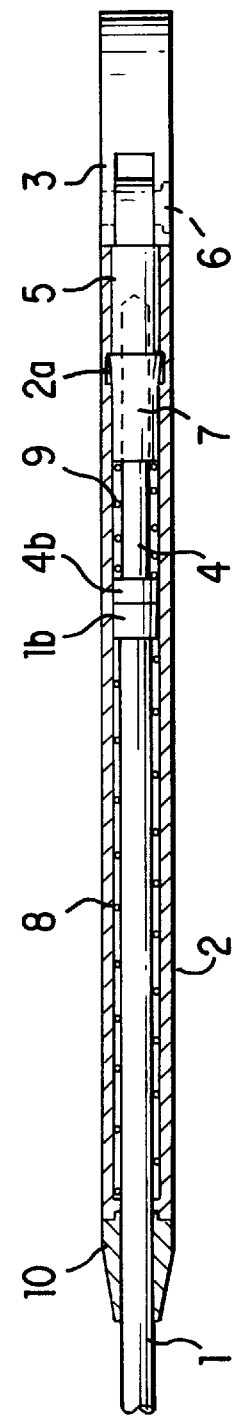

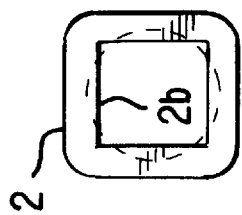
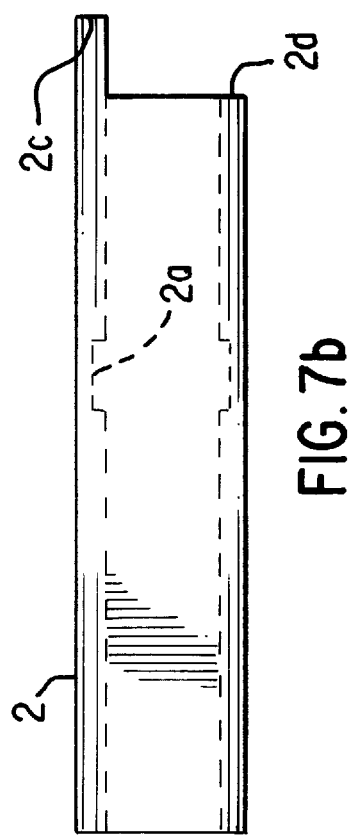
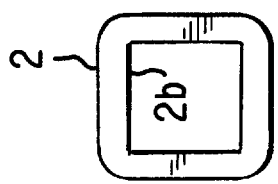
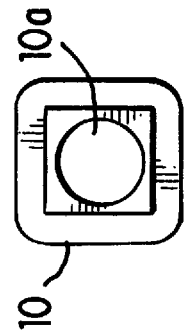
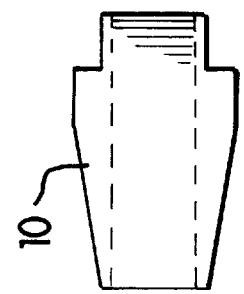
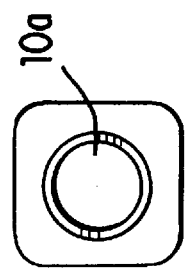

ELASTICALLY RETRACTING TEMPLE ASSEMBLIES FOR SPECTACLES

BACKGROUND OF THE INVENTION

The present invention relates to elastically retractable temple assemblies of a pair of spectacles for engaging ears such that the spectacles are held in place, being drawn toward a wearer's temples so as not to slip down.

A conventional pair of spectacles are known having temples that are collapsible for permitting storage in a case and that are rotatable outwards at both sides to permit wearing of the spectacles while not pressing against a wearer's temples. Elastic temples of a pair of spectacles are disclosed in Utility Model Laid Open Gazette Hei 4-33017, for example.

However, the above disclosed temples of a pair of spectacles are made elastic not for holding the spectacles in place or drawing the spectacle to the temples of a wearer when in use, but rather to be shortened in case that they are folded for storage.

SUMMARY OF THE INVENTION

The present invention solves a problem associated with spectacles with long temples or which have a long gap between temples, in that the spectacles are always loose and easily slip down when the spectacles are worn. Spectacles of the present invention are so constructed that temple assemblies are hooked on ears of a wearer and are slidably drawn by bias action of slide bias springs and also are rotationally biased toward temples of a wearer by rotational bias springs when worn.

In the present invention, the temple assemblies have sliding shafts and are rotatable apart from each other to permit widening of a space between them while rotational biasing biases the temple assemblies toward each other.

The temple assemblies also have a slide mechanism composed of sliding shafts and receiving tubes which permits their respective lengths to adjust to a distance between a face and the ears of a wearer and by operation of slide biasing springs.

BRIEF DESCRIPTION OF THE DRAWINGS

FIG. 3 is a cross-sectional plan view of an embodiment of the slide mechanism of the present invention;

FIG. 4 is a cross-sectional side view of the embodiment of the slide mechanism of FIG. 3;

FIGS. 7a, 7b and 7c are, respectively, front, top and back side views of a receiving tube of the slide mechanism of FIG. 3;

FIGS. 8a, 8b and 8c are, respectively, front, right and back side views of a cap 10 of the slide mechanism of FIG. 3;

DETAILED DESCRIPTION OF THE PRESENT INVENTION

Figure 1:
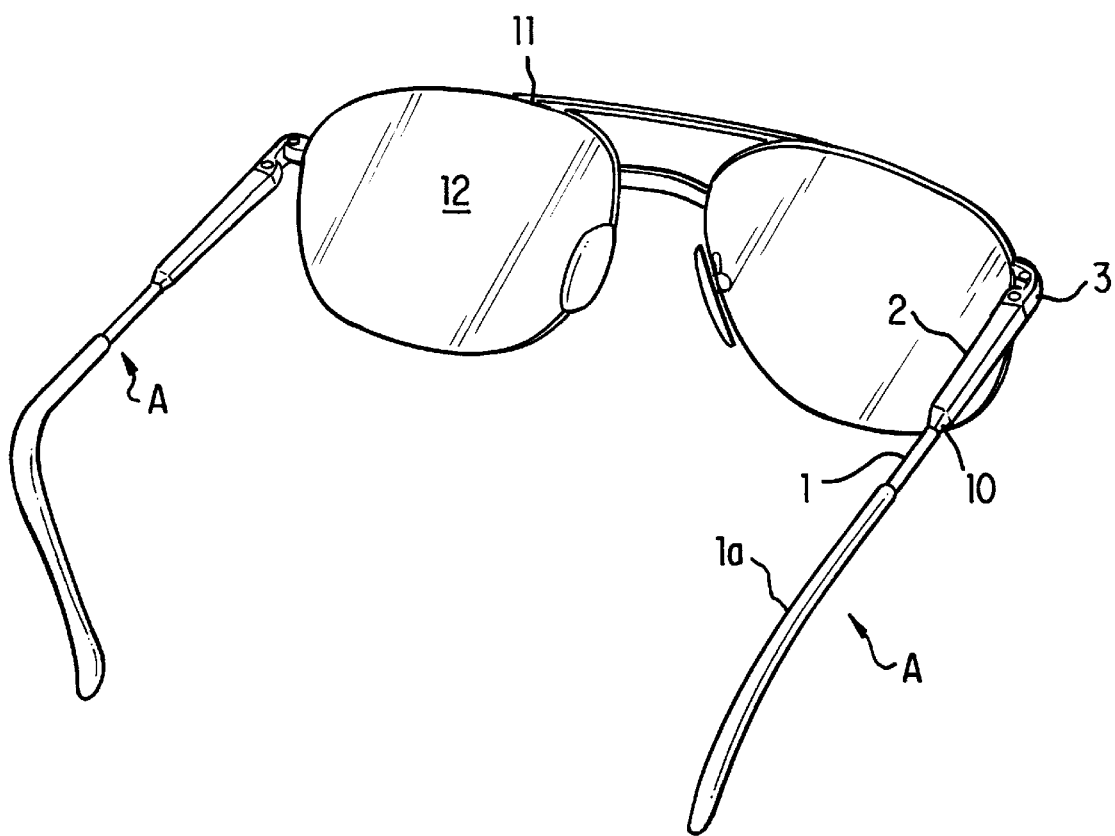
FIG. 1 is a perspective view of an embodiment of a pair of spectacles of the present invention having temple assemblies with a slide mechanism.
Figure 2:
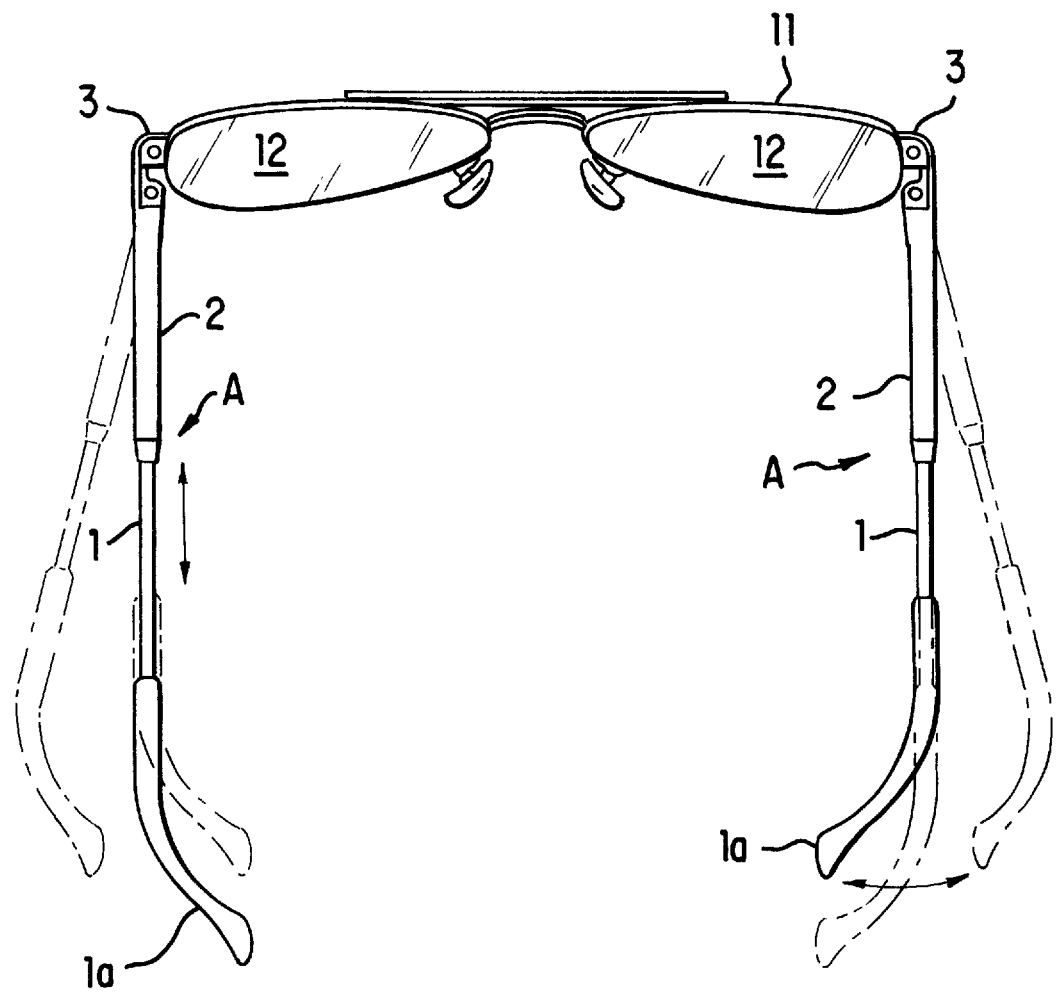
FIG. 2 is a perspective view of the temple assemblies of the present invention depicting elongated biased positions and rotated biased positions of the temple assemblies.
Figure 5:
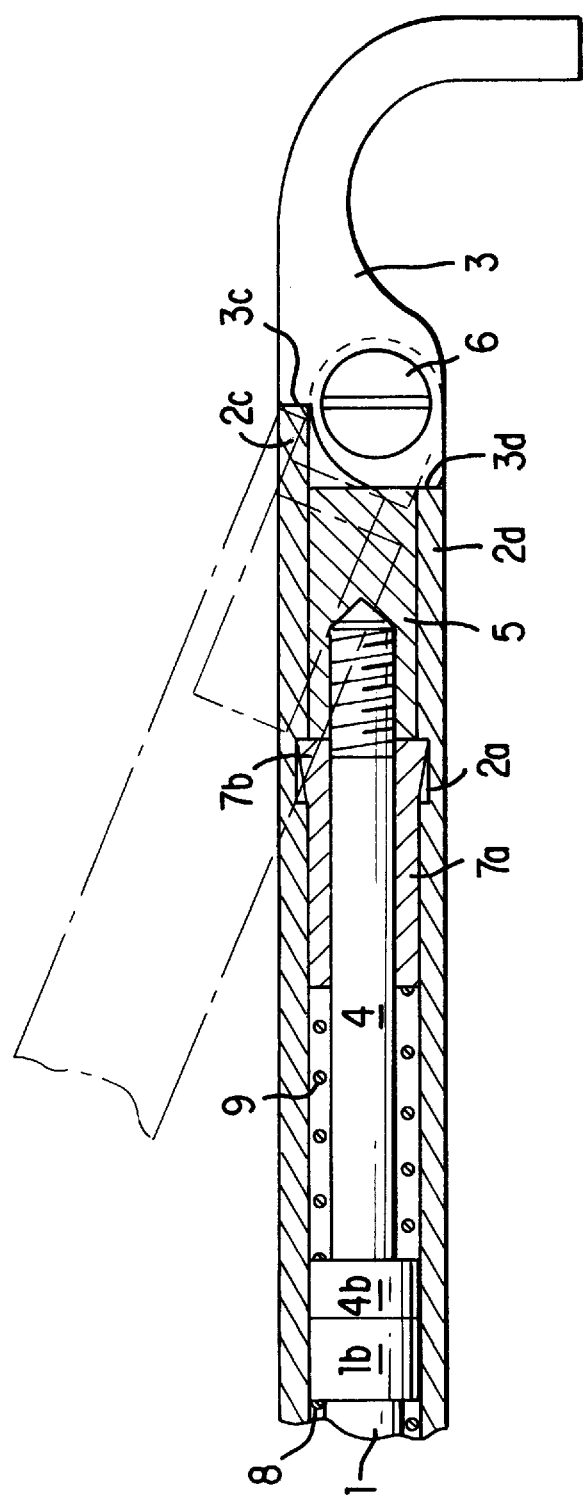
FIG. 5 is an enlarged cross-sectional plan view of the embodiment of the slide mechanism of FIG. 3.
Figure 6:
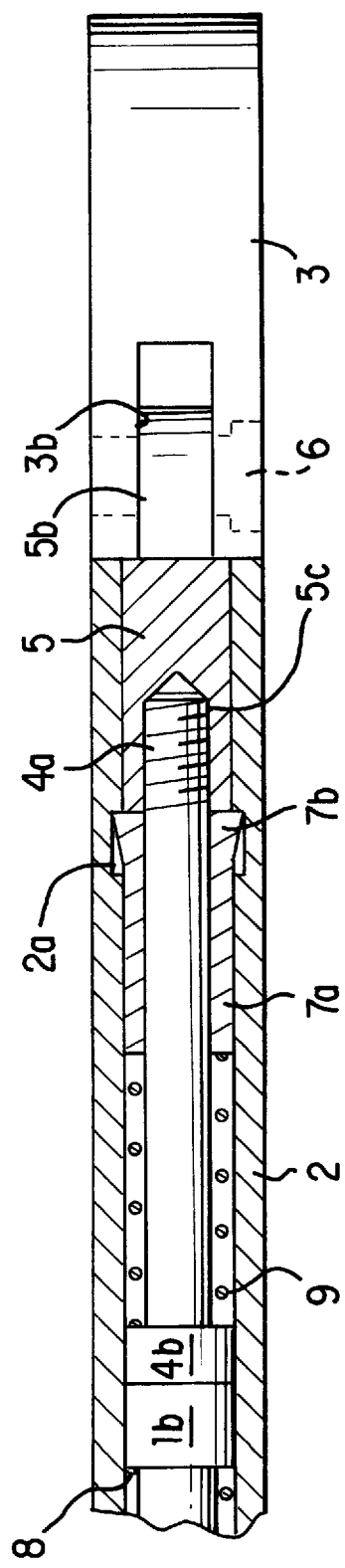
FIG. 6 is an enlarged cross-sectional side view of the embodiment of the slide mechanism of FIG. 3.

Referring to FIGS. 1–4, an embodiment of the present invention, which addresses a problem involving temples of spectacles that are long or have long range therebetween resulting in a loose fit and slippage, has temple assemblies A that hook on a wearer's ears and hold the spectacles in place by means of a length shortening spring biasing and a rotational spring biasing for rotating the temple assemblies A toward each other.

The temple assemblies A have sliding temple shafts 1 that are biased to be elastically retractable in addition to the temple assemblies A being rotationally biased toward each other. The sliding shafts 1 are elastically retracted into receiving tubes 2 by temple bias springs 8 and the receiving tubes 2 are rotationally biased by hinge bias springs 9.

The temple assemblies A are elastically retractable by virtue of a telescoping engagement of the sliding temple shafts 1 with the receiving tubes 2 permitting adjustment of their length to fit a distance between the face and the ears of a wearer by the retractive force of the temple shaft bias springs 8 incorporated therein such that the temple assemblies A are both rotationally biased for resisting widening of a distance between the temple assemblies A and elastically retractable to hold the spectacles in place.

Lenses 12 are fit in a frame 11, and frame hinge members 3 are fixed to left and right ends of the frame 11. Each of the frame hinge members 3 is bent perpendicularly in arc. One end of the frame hinge member 3 is fixed to the frame 11 and another end is connected the temple assembly A.

Referring to FIGS. 3–6, a pivot pin 6 is provided at a connection of the frame hinge member 3 with a temple hinge member 5 to permit rotation relative to the frame hinge member 3.

Figures 10A, 10B:
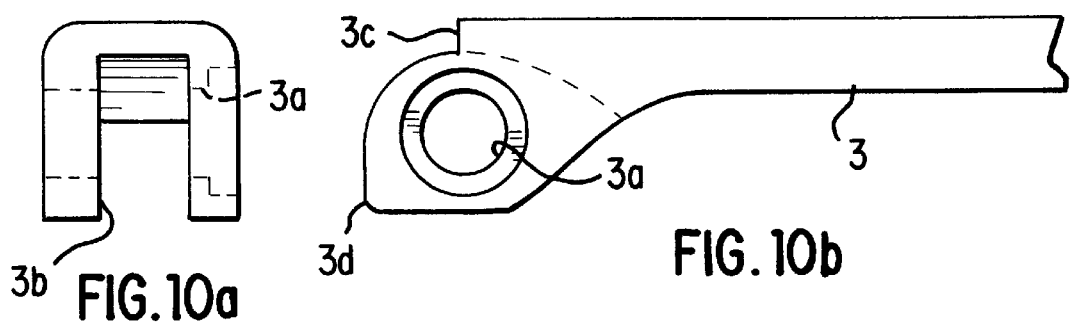
FIGS. 10a, 10b and 10c are, respectively, back, plan, and side views of a frame hinge member of the present invention.
Figure 10C:
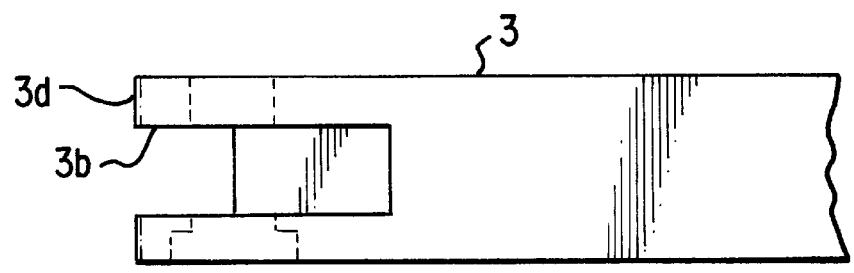

Referring to FIG. 10, an embodiment of a structure of the frame hinge member 3 has pivot holes 3a for insertion of the pivot pin 6 bored through the frame hinge member 3. The frame hinge member 3 has a groove 3b for insertion of the temple hinge member 5 which forms a U-shaped configuration from a front view.

Figures 9A, 9B, 9C:
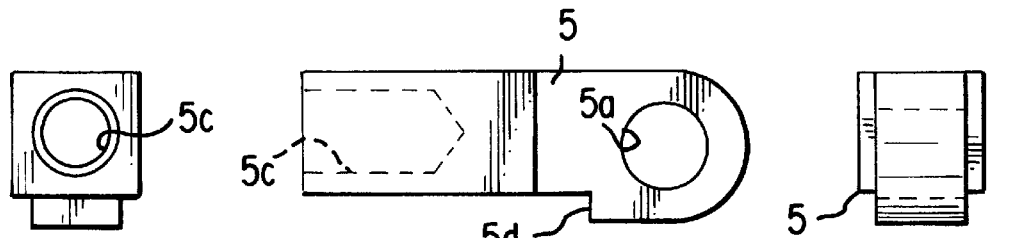
FIGS. 9a, 9b, 9c and 9d are respectively, back, plan, front, and side views of a temple hinge member of the slide mechanism of FIG. 3.
Figure 9D:
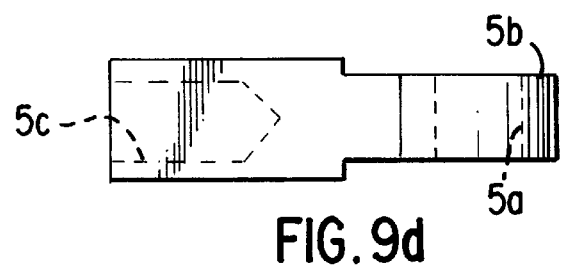

Referring to FIG. 9, an embodiment of a structure of the temple hinge member 5 has the pivot pin 6 inserted into a pivot hole 5a bored through a lug 5b at one end of the temple hinge member 5. The lug 5b is inserted into the groove 3b whereby the temple hinge member 5 is rotatably connected to the frame hinge member 3 by the pivot pin 6. A screw hole 5c is formed at another end of the temple hinge member 5 opposite to the frame hinge member 3.

Referring to FIGS. 3–6, a slidable hinge shaft 4 has a screw portion 4a at one end thereof which is screwed into the screw hole 5c of the temple hinge member 5. When the screw portion 4a is screwed into the screw hole 5c, a hinge bias spring 9 and a sliding guide clip 7 are disposed between a hinge shaft spring seat 4b and the temple hinge member 5.

Figure 11:
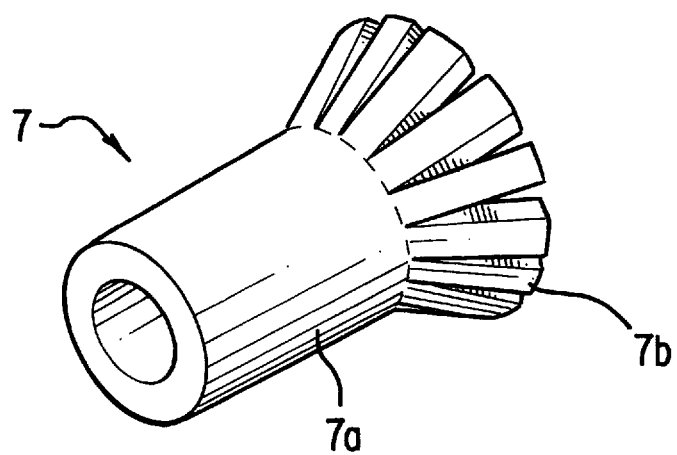
FIG. 11 is a perspective view of a sliding guide clip.

The sliding guide clip 7 functions as a second spring seat for an end of the hinge bias spring 9 facing toward the temple hinge member 5, as a guide for sliding of the slidable hinge shaft 4, and as a clip for holding the slidable hinge shaft 4 and the sliding temple shaft 1 in the receiving tube 2. The sliding guide clip 7 has a tube part 7a and a stopper part 7b as shown in FIG. 11.

Referring to FIGS. 7a–7c, the receiving tube 2 has a square slide bore 2b into which the stopper part 7b is pressed. The sliding guide clip 7 is inserted in the square slide bore 2b until the stopper part 7b reaches an arresting recess 2a whereat the stopper part 7b expands into the arresting recess 2a due to its elasticity. Thus, the sliding guide clip 7 is retained in the receiving tube 2.

The sliding temple shaft 1 is first inserted into the receiving tube 2 and the slidable hinge shaft 4 and the sliding guide clip 7 are simultaneously inserted, whereby the sliding guide shaft 7 prevents the sliding temple shaft 1 and the slidable hinge shaft 4 from slipping out of the receiving tube 2.

The slidable hinge shaft 4 and the temple hinge member 5 are pivoted together as one body relative to the frame hinge member 3 on the pivot pin 6. The lengths of the slidable hinge shaft 4, the temple hinge member 5 and the frame hinge member 3 do not change. However, the receiving tube 2 enclosing the slidable hinge shaft 4 and the temple hinge member 5 can slide by compression of the hinge bias spring 9.

In such a construction, when either of the receiving tubes 2 is rotated outward, pivoting on the pivot pin 6, sliding of the slidable hinge shaft 4 and the temple hinge member 5 against bias action of the hinge bias spring 9 in the receiving tube 2 absorbs displacement which occurs between the receiving tube 2 and the temple hinge member 5 due to pivoting resulting from a contact part 3c of the frame hinge member 3, shown in FIG. 10b, and a projection 2c of the receiving tube 2 shown in FIG. 7b.

When outward pressure on the receiving tube 2 is stopped, ending outward rotation thereof, the bias action of the hinge bias spring 9 returns the slidable hinge shaft 4, the temple hinge member 5 and the receiving tube 2 to stable positions whereat a stopper end 2d of the receiving tube 2 contacts a stopper end 5d of the temple hinge member 5 and a stopper end 3d of the frame hinge member 3 such that the frame hinge member 3 and the receiving tube 2 are aligned in a straight line.

Referring now to FIGS. 3, 4 and 7, the square slide bore 2b is formed square to accept the hinge shaft spring seat 4b and a temple shaft spring seat 1b, which are also formed square, in non-rotating slidable engagement. The temple shaft bias spring 8 is disposed between the temple shaft spring seat 1b and a cap 10. When the sliding temple shaft 1 is pulled out, the temple shaft bias spring 8 is compressed and the temple shaft spring seat 1b is separated from the hinge shaft spring seat 4b allowing the sliding temple shaft 1 to slide and extend. A hook part 1a, to be hooked on an ear, is joined to the other end of the sliding temple shaft 1 by adhesives in a final assembly step.

The temple shaft spring seat 1b of the sliding temple shaft 1 and the hinge shaft spring seat 4b of the slidable hinge shaft 4 are so close to each other that the hinge shaft spring seat 4b also functions as a stopper against the bias action of the sliding temple shaft 1 provided by the temple shaft bias spring 8, whereby the receiving tube 2 is rotated outward such that the hinge shaft spring seat 4b changes its position in the receiving tube 2 and slides toward the temple hinge member 5. The sliding temple shaft 1 also slides with its spring seat 1b contacting the hinge shaft spring seat 4b.

The receiving tube 2 and the cap 10 are made separately and are united by welding or other methods afterwards because the receiving tube 2 is a square tube with the square slide bore 2b bored inside while the cap 10 has a round hole 10a for slidably guiding the sliding temple shaft 1 which is formed from a round shaft. If the receiving tube 2 and the cap 10 are made as a single body, the process of boring such holes becomes complicated.

The sliding temple shaft 1, the receiving tube 2, the temple hinge member 5, the temple shaft bias spring 8 and the hinge shaft bias spring 9, which are inserted in the square tube of the receiving tube 2 followed by attachment of the cap 10, are all inserted into the open end of the square hole of the receiving tube 2 on the side toward the frame hinge member 3 of.

During assembly, into the opening on the side the frame hinge member 3 of the receiving tube 2 is inserted the sliding temple shaft 1 as a straight shaft with the temple shaft bias spring 8 disposed on it before the hook part 1a is mounted. An assembly comprising the slidable hinge shaft 4 with the hinge bias spring 9 disposed thereon and the sliding guide clip 7 screwed in the temple hinge member 5 is inserted into the receiving tube 2 such that the sliding guide clip 7 engages the arresting recess 2a to complete the assembling of the receiving tube 2, the sliding temple shaft 1, the slidable hinge shaft 4 and temple hinge member 5. As a final step, the hook part 1a is joined to the end of the sliding temple shaft 1 by adhesives.

In the next assembly procedure, the pivot hole 5a of the temple hinge member 5 is aligned with the pivot holes 3a of the frame hinge member 3 and the pivot pin 6 is inserted in the pivot holes 3a and 5a, completing the assembling processes.

Since temple assemblies A each include sliding temple shaft 1, the receiving tube 2 and the frame hinge member 3 with the sliding temple shaft 1 biased by the temple bias spring 8 disposed within the receiving tube 2 and on the sliding temple shaft 1 as set forth above, the sliding temple shafts 1 are elastically adjustable to different lengths to accommodate wearers of differing physical proportions while preventing slippage of the spectacles.

Furthermore, since each of the receiving tubes 2 is cylindrical and each of the sliding temple shafts 1 is telescopically received in the receiving tube 2 and can slide in it, the temple assemblies A are thin and elastic and not bulky.

Still further, since each of the receiving tubes 2 is a square tube and the part of the sliding temple shaft 1 inside the receiving tube 2 is square-shaped, the relative axial position of the sliding temple shafts 1 and each of the receiving tubes 2 is kept, or in other words, the sliding temple shaft 1 does not rotate about an axis of the receiving tube 2 while the sliding temple shaft 1 is sliding.

Also, since each of the temple assemblies A comprises said sliding temple shaft 1, the receiving tube 2 and the frame hinge member 3, wherein the temple shaft bias spring 8 is disposed on the sliding temple shaft 1 and within the receiving tube 2 overlapped with each other, and the hinge bias spring 9 is disposed on the slidable hinge shaft 4 and within the receiving tube 2, the temple assemblies A are not only elastic but also elastically rotatable outwards at both sides. Even if the bias force of the temple shaft bias springs 8 is small, the bias force of the hinge shaft bias springs 9 biasing together the temple assemblies A against the temples of a wearer assist the temple assemblies A in holding the spectacles in place. Thus, weak and thin temple shaft bias springs 8 are sufficient to operate the sliding temple shafts 1.

Additionally, since the receiving tubes 2 have both the sliding temple shafts 1 and the slidable hinge shafts 4 telescopically received in the receiving tube 2, both the mechanisms for sliding and rotation are combined in the receiving tube 2, whereby the temple assemblies A are compact and prevented from becoming thick, long and large.

Further still, since each of the receiving tubes 2 is a square tube and the part of the slidable hinge shaft 4, which is inside of the receiving tube 2, is square-shaped, the position between the sliding temple shafts 1 and the frame 11 cannot change by outward rotation or elastic extension of the temple assemblies A.

Finally, since the ends of the sliding temple shaft 1 and the slidable hinge shaft 4 are close to each other in each of the receiving tubes 2 when the sliding temple shaft 1 is drawn back in the receiving tube 2, the ends also function as stoppers, whereby it is not necessary to provide a stopper for the receiving tube 2 and a stopper against the sliding temple shaft 1.

What is claimed is:

1. A temple assembly for pivotable attachment to a lens holding frame of spectacles, the temple assembly comprising:
   a first temple portion having a pivot means for pivotably attaching to said lens holding frame and an abutment for engaging said lens holding frame to restrict outward pivoting of said first temple portion away from said lens holding frame;
   a second temple portion having a first end portion with an ear engaging section and a second end portion slidably engaging said first temple portion; and
   a temple bias means for retractably biasing said first temple portion and said second temple portion to bias said ear engaging section toward said first temple portion.

2. The temple assembly of claim 1 wherein:
   said second end portion of said second temple portion is a temple shaft; and
   said first temple portion includes a receiving tube for slidably receiving said temple shaft therein.

3. The temple assembly according to claim 2, wherein said receiving tube is a square tube and at least part of said temple shaft is a square part slidably received in said square tube such that rotation of said temple shaft in said square tube is prevented.

4. The temple assembly of claim 1 wherein said temple bias means includes a spring compressively engaged by said first temple portion and said second temple portion for retractably biasing said first temple portion and said second temple portion to bias said ear engaging section toward said first temple portion.

5. The temple assembly of claim 1 wherein:
   said pivot means includes a temple hinge member having a hinge shaft with a pivot lug pivotably attachable to said lens holding frame;
   said first temple portion includes a receiving tube for slidably receiving said hinge shaft therein; and
   a hinge bias means for retractably biasing said hinge shaft into said receiving tube to oppose extraction of said hinge shaft from said receiving tube by pivoting action of said abutment engaging said lens holding frame.

6. The temple assembly according to claim 5, wherein said receiving tube is a square tube and at least part of said hinge shaft is a square part slidably received in said square tube such that rotation of said hinge shaft in said square tube is prevented.

7. The temple assembly of claim 5, wherein:
   said second end portion of said second temple portion is a temple shaft; and
   said receiving tube slidably receives said temple shaft therein.

8. The temple assembly according to claim 7, wherein said receiving tube is a square tube and at least part of said temple shaft is a square part slidably received in said square tube such that rotation of said temple shaft in said square tube is prevented.

9. The temple assembly according to claim 8, wherein at least part of said hinge shaft is a square part slidably received in said square tube such that rotation of said hinge shaft in said square tube is prevented.

10. The temple assembly according to claim 5, wherein
    said second end portion of said second temple portion is a temple shaft;
    said receiving tube slidably receives said temple shaft therein;
    said temple shaft has an end in said receiving tube;
    said hinge shaft has an end in said receiving tube; and
    said end of said temple shaft and said end of said hinge shaft abut each other inside said receiving tube.

11. The temple assembly according to claim 5, wherein said biasing means includes:
    a first spring compressively engaged by said temple shaft and said receiving tube for retractably biasing said temple shaft into said receiving tube; and
    a second spring compressively engaged by said hinge shaft and said receiving tube for retractably biasing said hinge shaft into said receiving tube.

12. A temple assembly for pivotable attachment to a lens holding frame of spectacles, the temple assembly comprising:
    a first temple portion having a pivot means for pivotably attaching to said lens holding frame and an abutment for engaging said lens holding frame to restrict outward pivoting of said first temple portion away from said lens holding frame;
    a second temple portion having a first end portion with an ear engaging section and a second end portion slidably engaging said first temple portion;
    said second end portion of said second temple portion being a temple shaft;
    said first temple portion including a receiving tube for slidably receiving said temple shaft therein through a first end opening;
    said pivot means including a temple hinge member having a hinge shaft with a pivot lug pivotably attachable to said lens holding frame, said hinge shaft being slidably received in said receiving tube through a second end opening of said receiving tube; and
    biasing means for retractably biasing said temple shaft into said receiving tube and for retractably biasing said hinge shaft into said receiving tube to oppose extraction of said hinge shaft from said receiving tube by pivoting action of said abutment engaging said lens holding frame.

* * * * *